US010009450B1

(12) United States Patent
Annan et al.

(10) Patent No.: US 10,009,450 B1
(45) Date of Patent: *Jun. 26, 2018

(54) DETECTING NON-TOUCH APPLICATIONS

(71) Applicant: Sprint Communications Company L.P., Overland Park, KS (US)

(72) Inventors: Brandon Christopher Annan, Westwood Hills, KS (US); Raymond Emilio Reeves, Olathe, KS (US); Ryan Alan Wick, Apollo Beach, FL (US); John Marvin Jones, III, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 42 days.

This patent is subject to a terminal disclaimer.

(21) Appl. No.: 14/501,844

(22) Filed: Sep. 30, 2014

Related U.S. Application Data

(63) Continuation of application No. 12/693,072, filed on Jan. 25, 2010, now Pat. No. 8,887,129.

(51) Int. Cl.
*G06F 9/44* (2018.01)
*G06F 9/445* (2018.01)
*G06F 13/10* (2006.01)
*H04M 1/725* (2006.01)

(52) U.S. Cl.
CPC ........ *H04M 1/72525* (2013.01); *G06F 9/445* (2013.01)

(58) Field of Classification Search
CPC .................. H04M 1/72525; H04M 1/72527
See application file for complete search history.

(56) References Cited

U.S. PATENT DOCUMENTS

| 7,316,022 | B2 * | 1/2008 | Nishio | G06F 9/4411 709/221 |
| 8,830,176 | B2 * | 9/2014 | Bos | G06F 3/0237 345/157 |
| 9,086,775 | B1 * | 7/2015 | Tse | G06F 17/30899 |
| 2009/0113044 | A1 * | 4/2009 | Lancaster | H04L 41/0803 709/224 |
| 2009/0270078 | A1 * | 10/2009 | Nam | G06F 3/0238 455/414.1 |
| 2009/0300578 | A1 * | 12/2009 | Neil | G06F 9/4443 717/104 |
| 2010/0001968 | A1 * | 1/2010 | Lee | G06F 1/1626 345/173 |
| 2010/0105454 | A1 * | 4/2010 | Weber | G06Q 30/02 463/1 |
| 2010/0115402 | A1 * | 5/2010 | Knaven | G06F 17/276 715/261 |
| 2010/0115502 | A1 * | 5/2010 | Jiva | G06F 9/45516 717/148 |

(Continued)

*Primary Examiner* — Li B Zhen
*Assistant Examiner* — Mohammad Kabir

(57) ABSTRACT

A computer-implemented method, computer-readable media, and wireless device that automatically determines whether an application requires a virtual input mechanism are provided. The wireless device includes a virtual machine and database. The virtual machine executes the application and parses code associated with the application to determine whether a virtual input mechanism is necessary. The database stores metadata that indicates whether the type of input needed for the application is touch or key.

20 Claims, 3 Drawing Sheets

(56) References Cited

U.S. PATENT DOCUMENTS

| | | | |
|---|---|---|---|
| 2010/0227605 A1* | 9/2010 | Fournier | H04L 63/123 455/419 |
| 2010/0285839 A1* | 11/2010 | Jeong | H04N 21/234336 455/557 |
| 2013/0002560 A1* | 1/2013 | Chen | G06F 3/0416 345/168 |

* cited by examiner

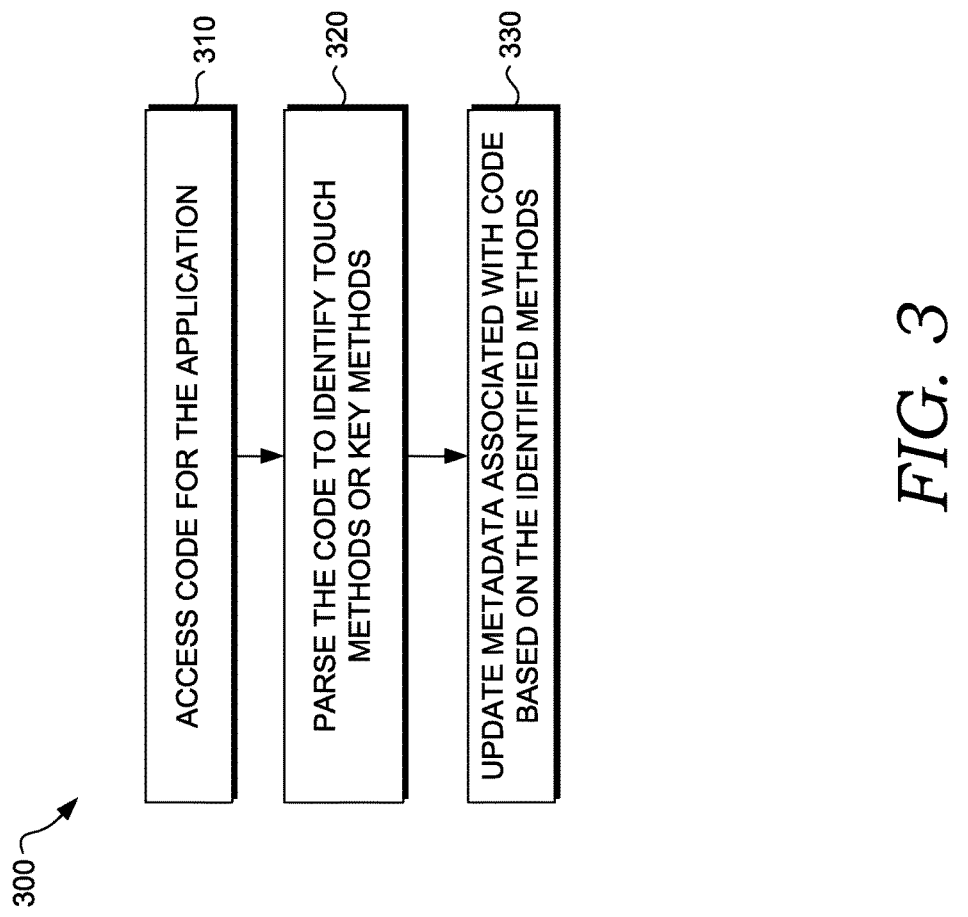

DETECTING NON-TOUCH APPLICATIONS

PRIORITY

This is a continuation of U.S. application Ser. No. 12/693,072, entitled "Detecting Non-Touch Applications," filed on Jan. 25, 2010, which is hereby incorporated by reference in its entirety.

SUMMARY

Embodiments of the invention are defined by the claims below. Embodiments of the invention provide wireless devices, methods, and computer-readable media for, among other things, determining whether an application requires a virtual input mechanism. The embodiments of the invention have several practical applications in the technical arts including providing support of non-touch applications executing on a touch-interface-only wireless device, and dynamically generating virtual input mechanisms for non-touch applications.

In a first embodiment, a computer-implemented method to determine whether an application requires the virtual input mechanisms is provided. The computer-implemented method may be executed by a server or a wireless device during application runtime or during installation of the application. The code of the application is parsed to identify touch or key methods. In turn, a database is updated with metadata that indicates whether the application requires the virtual input mechanisms.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE SEVERAL VIEWS OF THE DRAWINGS

Illustrative embodiments of the invention are described in detail below with reference to the attached drawing figures, which are incorporated by reference herein and wherein:

FIG. 3 is another exemplary logic diagram that illustrates a computer-implemented method that determines whether an application requires a virtual input mechanism.

DETAILED DESCRIPTION

Figure 1:
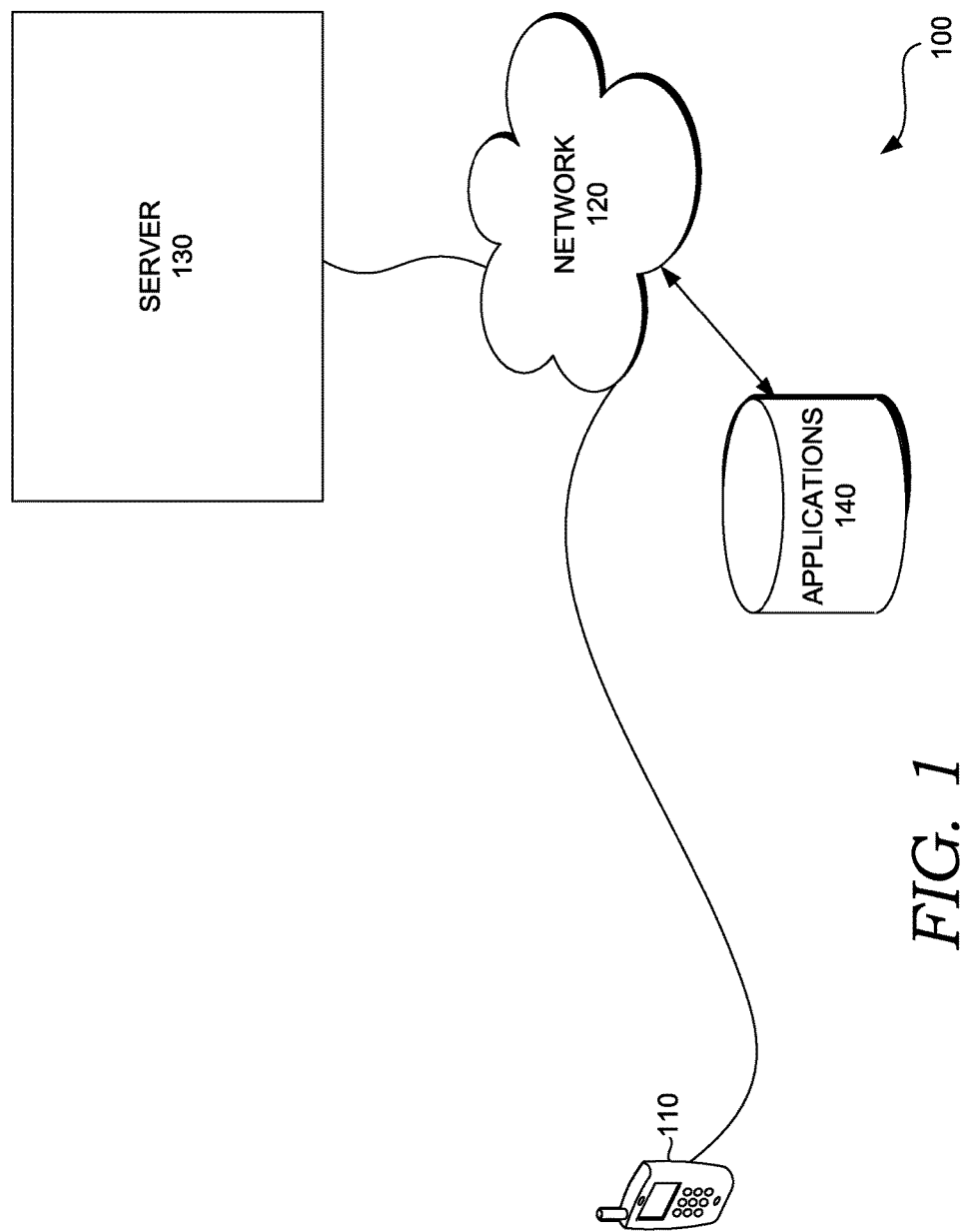
FIG. 1 is an exemplary network diagram that illustrates a wireless system, in accordance with embodiments of the invention.

Embodiments of the invention provide wireless devices, computer-readable media, and computer-implemented methods for detecting non-touch applications and dynamically generating virtual input mechanisms for the non-touch applications. The non-touch applications are applications that are configured to use key inputs. For instance, the non-touch applications may be designed to work with keys available to a device, such as wireless devices. The keys may include a 3×4 keypad with 0-9, #, and *; a direction input with up, down, left, right; a selection input with an "OK" button or "phone" button; a menu button; and two or more "softkeys" located under the screen. Other applications, such as touch applications, may be configured to work with touch inputs or in certain embodiments, the touch applications may work with either touch inputs or key inputs. Embodiments of the invention allow a wireless device with a touch screen interface to execute a non-touch applications by dynamically generating appropriate virtual input mechanisms for the non-touch applications.

In some embodiments, the virtual input mechanism may be generated manually or dynamically. To manually generate the virtual input mechanism, a user may select a toggle switch to display a standard virtual key interface. The virtual input mechanism provides a means for a user to interface with an application using a set of keys configured to perform actions, including but not limited to, direction input, number input, menu input, and selection input. In another embodiment, the virtual input mechanism is generated dynamically based on the code associated with the application. A virtual machine associated with the wireless device may parse the code to automatically determine if an application is written to expect key input. In turn, the application is identified as a non-touch application if the virtual machine locates code that suggests the application expects only key inputs. The virtual machine may generate a virtual input mechanism specific to the key inputs indentified in the code. In some embodiments, the user may use the toggle to manually override the automatic detection and display a standard set of keys.

The virtual machine may store metadata in a storage. The metadata indicates whether the code is non-touch. In one embodiment, the storage is a database. The wireless device may include a database that lists the applications available on the wireless device. For each application, the database may store an indication of whether the application is non-touch, an indication of whether a virtual input mechanism is applied per screen or globally, and the location of a java application descriptor file for the application. In another embodiment, the database is stored externally from the wireless device. In certain embodiments, the java application descriptor file may include the indication of whether the application is non-touch and the indication of whether a virtual input mechanism is applied per screen or globally.

Throughout the description of the embodiments of the invention, several acronyms and shorthand notations are used to aid the understanding of certain concepts pertaining to the associated system and services. These acronyms and shorthand notations are intended to help provide an easy methodology of communicating the ideas expressed herein and are not meant to limit the scope of the embodiments of the invention. The following is a list of these acronyms:

API Application Programming Interface
CD-ROM Compact Disc-Read Only Memory
DVD Digital Versatile Discs
EEPROM Electronically Erasable Programmable Read Only Memory
JAD Java Application Descriptor
JAR Java Archive
PDA Personal Data Assistant
RAM Random Access Memory
ROM Read Only Memory
VIM Virtual Input Mechanism
VM Virtual Machine As one skilled in the art will appreciate, embodiments of the invention include, among other things: a method, wireless system, and a computer-program product. Accordingly, the embodiments may take the form of a hardware embodiment, firmware embodiment, a software embodiment, or an embodiment combining software and hardware. In one embodiment, the computer-program product includes computer-useable instructions embodied on one or more computer-readable media for updating configuration information.

Computer-readable media include both volatile and nonvolatile media, removable and nonremovable media, and contemplates media readable by a database, a switch, and various other network resources. Network switches, routers, firewalls, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

A wireless system enables wireless devices to detect whether an application requires a VIM during installation of the application or runtime of the application. The VIM is generated dynamically or in response to a manual selection provided by the user. In some embodiments, the wireless device includes a virtual machine that parses the code associated with the application to determine whether the application supports key input or touch inputs.

FIG. 1 is an exemplary network diagram that illustrates a wireless system 100, in accordance with embodiments of the invention. The wireless system 100 includes a wireless device 110, a network 120, a server 130, and an application database 140.

The wireless devices 110 are configured to connect to the server 130 and application database 140 over the network 120. The wireless devices 110 include computers, laptops, PDAs, smartphones, modems, or any other computing device. The wireless devices 110 may communicate wirelessly using mobile broadband. The wireless devices 110 are operated by a user to initiate communications with wireless devices 110 or other network resources. The wireless devices 110 also download, install, and execute applications received from the application database 140. In some embodiments, the wireless devices 110 have a touch screen interface used to execute applications installed on the wireless devices 110.

The network 120 connects servers 130 to the wireless device 110 and the applications database 140. The network 120 may include a local area network, a wide area network, a virtual private network, or the Internet. The network 120 allows the servers 130 to communicate with wireless devices 110.

The servers 130 are connected to the network 120 and communicate with wireless devices 110. The servers 130, may include content servers, multimedia servers, email servers, web servers, or storage servers. The servers 130 may push data to the wireless devices 110 or respond to request for data received from the wireless devices 110. In one embodiment, the servers 130 provide the wireless devices 110 with one or more applications stored in the applications database 140. The servers 130 may also parse code associated with the applications to detect whether the application requires a VIM. In turn, the servers 130 may notify the wireless devices 110 that the application supports, key inputs, touch inputs, or both key inputs and touch inputs. In some embodiments, the servers 130 may remotely execute the applications for the wireless devices 110.

The applications database 140 is connected to the network 120. The applications database provide applications to the wireless device 110 or server 130. The applications include Java applications that are executed by either the wireless device 110 or the server 130. In some embodiments, the applications are stored in a JAR file and each application is associated with a JAD file.

In certain embodiments, the wireless device may include a virtual machine and a database. The virtual machine parses the code for the applications, and the database stores an indication of whether the application requires the VIM. The wireless device may include a touch screen configured to receive touch inputs and to display the VIM when needed.

Figure 2:
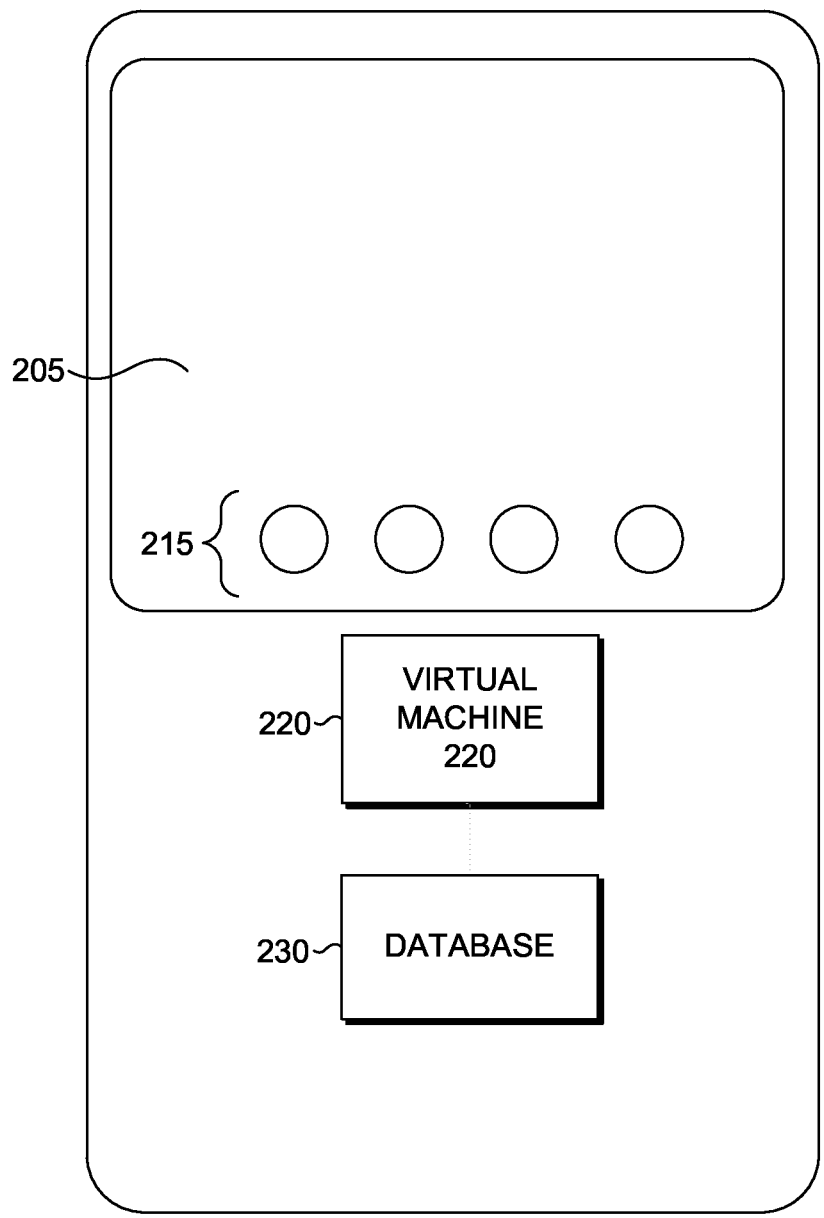
FIG. 2 is an exemplary component diagram that illustrates a wireless device included in the wireless system, in accordance with embodiments of the invention.

FIG. 2 is an exemplary component diagram that illustrates a wireless device included in the wireless system, in accordance with embodiments of the invention. The wireless device may include a touch screen 205, VIM 215, VM 220, and database 230. The wireless device may request that an application be installed or executed. In turn, the VM 220 parses the code to detect whether the application requires the VIM 215. The VM 220 may support a java API or some other programming interface that enables user interaction with a touch screen of the wireless device. The programming interface may configure the VIM 215 that is created dynamically or upon request by the user. In one embodiment, the VM 220 checks for a toggle flag to determine whether a user has overridden the automatic detection process.

The touch screen 205 displays the VIM 215. The touch screen 205 also receives user interactions that include touches from a stylus pen, a finger, or some other pointer instrument. The user interaction may be directed to a VIM 215 or another input screen displayed by the wireless device.

The VIM 215 is generated by the VM 220 in response to the automatic detection process. Alternatively, the VIM 215 is generated in response to a toggle switch selected by the user of the wireless device. In one embodiment, the VIM 215 displays of a set of keys that are applied either globally to the application or per screen of the application. The VM 220 that parses the code may select a global VIM 215. This means if one screen of the application requires key input, the VM 220 generates a global VIM 215 for all screens of the application. Alternatively, the VM 220 that parses the code may select a per screen VIM 215. Thus, VM 220 may execute the automatic detection process per screen. The VM 220 may chose to execute the automatic detection process at install or at runtime—prior to showing each screen—because some aspects of a screen may dynamically change.

The VM 220 is configured to execute the automatic detection process to determine whether the code of the application requires key inputs. The VM 220 may execute the detection process only once at install time to minimize the runtime delays. In an embodiment, the VM 220 may parse code stored in a JAR and store an indication of whether the VIM 215 is required in the JAD file associated with the application.

The automatic detection process may occur off the wireless device on a server, as a background process on the wireless device, or as part of the firmware of the VM 220 in the wireless device. In an embodiment, the server may update the JAD file to indicate that the applications supports, touch-only inputs, key-only inputs, or both key inputs and touch inputs.

In some embodiments, the VM 220 parses the code to locate touch methods or key methods. In turn, the VM 220 may dynamically generate VIM 215 based on key inputs identified in the code. The VM 220 may identify methods listening for inputs from physical keys, such as a press key method, a release key method, or hold key method. The VM 220 may detect whether the method includes a null process, which means code implementing the method is not included. In one embodiment, the VM 220 looks for a number of lines of code for each method. When a threshold number of code lines, e.g. 10, is present, the VM 220 identifies the keys associated with the method and includes those keys in the VIM 215 and the VM 220 updates an indication to specify that the application supports key inputs. The VM 220 also looks for touch methods, such as, finger release methods, drag methods, finger touch, etc. When a threshold number of code lines, e.g. 5, is present, the VM 220 updates an indication to specify that the application supports touch inputs.

For instance, the detection process may search the compiled code to determine if an application implemented a number of key input methods. The key input methods may include "protected void keyPressed(int keyCode)," "protected void keyReleased(int keyCode)," or "protected void keyRepeated(int keyCode)," etc. In another embodiment, the VM 220 may determine whether a number of constants associated with key inputs are defined in the code. The constants may include, java constants, such as "GAME_A," "GAME_B," "KEY_NUM1," "KEY_NUM2," "KEY_NUM3," "UP," "DOWN," "LEFT," and "RIGHT." The VM 220 may search for these constants to decide which "virtual input" is appropriate to include in the VIM 215. The VIM 215 for an application, in one embodiment, may include either navigation inputs: up/down/left/right, or numeric inputs: 0-9. The detection process may also search the compiled code to determine if an application implemented a number of touch input methods. The touch input method may include "protected void pointerPressed(int x, int y)," "protected void pointerReleased(int x, int y)," "protected void pointerDragged(int x, int y)," etc.

In one embodiment, the compiled code is checked to determine whether a form that requires key input is present. The form may include controls and text fields that take key input. For instance, a ChoiceGroup or CustomItem control may need a VIM 215. ChoiceGroup control may provide the user with a list of items and allow the user to select one. The ChoiceGroup control may require a VIM 215 with "up," "down," "left," "right," and "select" key inputs. Other controls may require different key inputs. The CustomItem may be associated with specific methods and may support key inputs, touch input, or both key and touch inputs. Accordingly, the code associated with the CustomItem is checked for methods similar to the above-identified key methods and touch methods.

The VM 220 may store the VIM 215 in a database 230 or JAD file. In one embodiment, the database 230 may include a listing of applications, their corresponding VIMs 215, and whether the VIM 215 is used globally or per screen. The database 230 identifies each application, the type of inputs supported, the VIMs 215 that were dynamically generated during a previous execution, and an indication of whether the user has overridden automatic detection and requests a standard VIM 215. Accordingly, the database 230 may be accessed by the VM to select a VIM 215 for display on the touch screen.

In certain embodiments, the code associated with the application may be parsed at runtime or at install. The wireless device may obtain an indication that a VIM is required and the wireless device may receive and display the VIM from storage or generate a VIM dynamically. The metadata associated with the application is updated by the wireless device to indicate that a VIM is required for the application.

FIG. 3 is another exemplary logic diagram that illustrates a computer-implemented method that determines whether an application requires a virtual input mechanism. The code for an application is identified in response to a request to install an application or a request to execute an installed application. The application may be installed on a wireless device or available via a server. The application may be a java application and its metadata is stored as part of a JAD file. In step 310, the identified code is accessed to begin detection of whether a VIM is required. In step 320, the code is parsed to identify touch methods or key methods. In one embodiment, the code may be parsed by any one of the server, a background process on the wireless device, or a virtual machine within the wireless device.

In step 330, metadata associated with the code is updated to indicate whether the application supports key inputs, touch input, or both key and touch inputs. In certain embodiments, an override is provided to allow a user of the application to choose to interface with the application with one of: a touch input or a key input. The override may include a toggle switch. The toggle switch may cause a standard VIM to be display to the user. In one embodiment, the toggle switch is a physical switch that is part of the wireless device. In an alternate embodiment, the toggle switch is a software element that is displayed by the user interface.

The virtual input mechanism that includes keys required by the application may also be generated dynamically when the application requires specific key inputs. The virtual input mechanism may be configured according to a size of a screen available to the application. The metadata associated with the application may be specific to each screen of the application or global to all application screens. The metadata may be used to determine whether to display the VIM for an application. In an embodiment, the metadata is stored in a database listing each application and the input preference for each application.

In summary, a wireless device may support applications designed for key input only, touch input only, or both key and touch inputs. A VM executing on wireless device may dynamically generate the VIM that allows the application to receive the user inputs. A database may be updated to identify the input preferences detected for each application.

Additional arrangements of the various components depicted, as well as components not shown, are possible without departing from the spirit and scope of the present invention. Embodiments of the invention are described with the intent to be illustrative rather than restrictive. It is understood that certain features and subcombinations are of utility and may be employed without reference to other features and subcombinations and are contemplated within the scope of the claims. Some steps listed in the various figures need be carried out in the specific order described.

The invention claimed is:

1. A computer-implemented method to determine whether an application requires a virtual input mechanism, the method comprising:

during installation of the application, parsing application code to identify a plurality of application code lines configured to implement at least one non-touch input method;

during the installation of the application, determining that the application lacks support for touch inputs via a touch screen based on the identified plurality of application code lines being configured to implement a non-touch input method; and during the installation of the application, updating metadata associated with the application to indicate that the application requires the virtual input mechanism based on the determination that the application lacks support for touch inputs.

2. The method of claim 1, wherein a server parses the code.

3. The method of claim 2, wherein the server may remotely execute the application for a wireless device.

4. The method of claim 1, wherein firmware on a virtual machine parses the code.

5. The method of claim 1, wherein the application is installed on a wireless device.

6. The method of claim 5, wherein the mobile device is a cellular telephone.

7. The method of claim 1, further comprising: generating the virtual input mechanism that includes virtual keys required by the application, wherein the virtual input mechanism is configured according to a screen size available to the application.

8. The method of claim 1, further comprising: providing an override that enables a user of the application to choose to interface with the application utilizing one of: touch inputs or key inputs.

9. The method of claim 8, wherein the override is a toggle switch.

10. The method of claim 9, wherein the toggle switch is a software element that is displayed by a user interface.

11. The method of claim 1, wherein the metadata is stored in a database listing the application and the input preference for the application.

12. The method of claim 1, wherein the virtual input mechanism is dynamically generated based at least in part on the plurality of application code lines configured to implement the at least one input method.

13. The method of claim 1, further determining that the application is configured to support at least key inputs based on the identified plurality of application code lines parsed from the application code, and further updating metadata associated with the application to indicate that the application requires the virtual input mechanism based further on the determination that the application is configured to support at least the key inputs.

14. The method of claim 1, wherein the at least one non-touch input method is operable to receive key inputs from a device keypad.

15. One or more non-transitory computer-readable media storing computer-executable instructions for performing a method to determine whether an application requires a virtual input mechanism, the method comprising:

parsing application code of the application, during application runtime, to identify a plurality of application code lines configured to implement at least one non-touch input method;

determining, during application runtime, that the application is not configured to support touch inputs via a touch screen based on the identified plurality of application code lines being configured to implement key inputs; and updating, during application runtime, metadata associated with the application to indicate that the application requires the virtual input mechanism based on the determination that the application is configured to support at least key inputs.

16. The media of claim 15, wherein the application is installed on a wireless device.

17. The media of claim 15, further comprising:

generating the virtual input mechanism that includes virtual keys required by the application, wherein the virtual input mechanism is configured according to a screen size available to the application; and providing an override that enables a user of the application to choose to interface with the application with one of: touch inputs or key inputs.

18. The media of claim 17, wherein the override is a toggle switch.

19. A server for detecting non-touch applications, the server comprising:

a database configured to store applications and corresponding pieces of application metadata; and a processor configured to read, for a particular application during application installation, a corresponding piece of application metadata and determine whether the particular application is touch-enabled based on the corresponding piece of application metadata, wherein the processor performs the following steps when the corresponding piece of application metadata fails to indicate that the particular application is configured to support touch inputs via a touch screen:

parse application code of the particular application, during application installation, to identify a plurality of application code lines configured to at least implement non-touch inputs, and update the corresponding piece of application metadata, during application installation, in the database such that the virtual input mechanism is generated for the particular application based on determining that the identified plurality of application code lines is configured to at least implement non-touch inputs.

20. The system of claim 19, wherein the virtual input mechanism is dynamically generated based at least in part on the plurality of application code lines configured to implement the non-touch inputs.

* * * * *